H. BECK.
ELECTRIC ARC LAMP FOR SEARCH LIGHTS, PROJECTORS, AND THE LIKE.
APPLICATION FILED NOV. 22, 1913.

1,086,311.

Patented Feb. 3, 1914.

Witnesses:

Inventor:
Heinrich Beck
by P. Singer
Atty

UNITED STATES PATENT OFFICE.

HEINRICH BECK, OF MEININGEN, GERMANY.

ELECTRIC-ARC LAMP FOR SEARCH-LIGHTS, PROJECTORS, AND THE LIKE.

1,086,311. Specification of Letters Patent. Patented Feb. 3, 1914.

Application filed November 22, 1913. Serial No. 802,489.

*To all whom it may concern:*

Be it known that I, HEINRICH BECK, a subject of the German Emperor, and residing at Meiningen, Germany, have invented certain new and useful Improvements in Electric-Arc Lamps for Search-Lights, Projectors, and the like, of which the following is a specification.

My invention relates to an improvement on the methods of working electric arc lamps and of arranging the electrodes for search lights, projectors, and the like, as disclosed in my United States Patent No. 1,029,787.

I have, by the aid of further experiments, found that proper working conditions for arc lamps when the electrodes are charged with a high current density may be provided by other means than subjecting the electrodes to the action of an indifferent gas or vapor surrounding the burning end of the positive carbon while the lamp is in use. For this it is necessary that means be employed which will deflect the arc flame proceeding from the negative electrode from the crater of the positive electrode, and that the current shall emerge essentially at the front end of the positive electrode.

Figure 1:
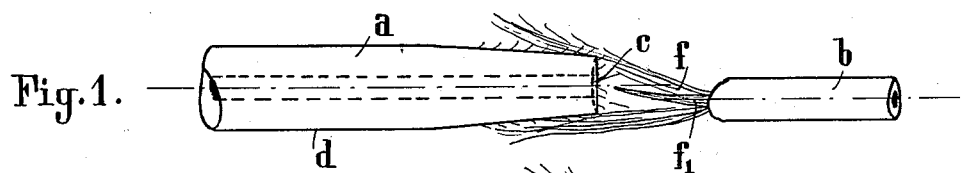
Figure 2:
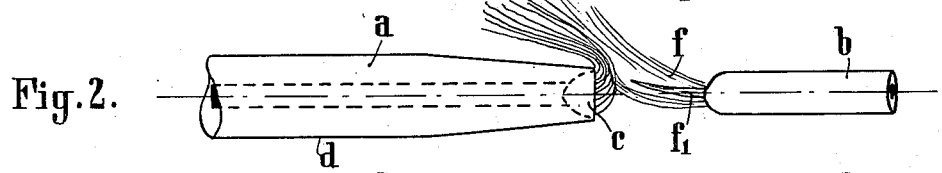
Figure 3:
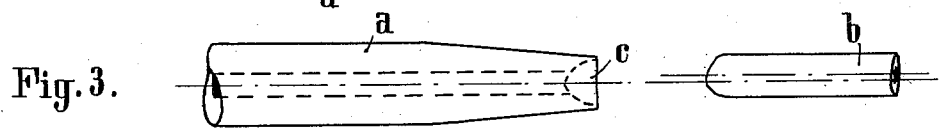
Figure 4:
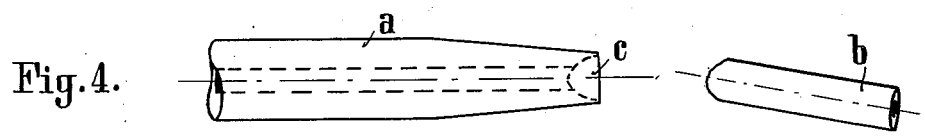
Figure 5:
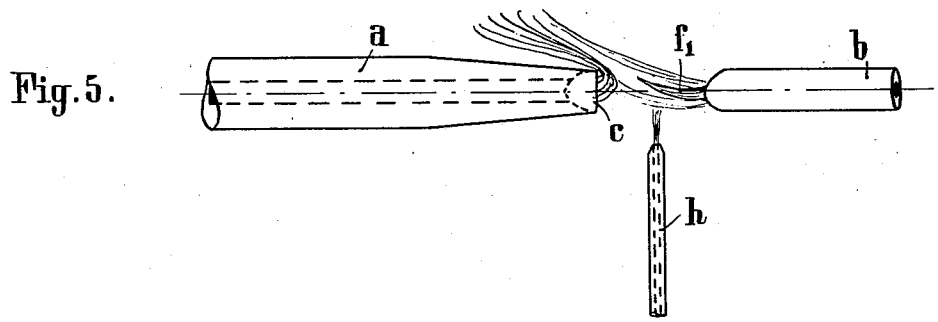

In the accompanying drawing: Figure 1 shows two arc lamp electrodes, in the condition of burning which it is the object of my invention to avoid. Fig. 2 shows the electrodes in the condition of burning which is to be obtained through my invention. Fig. 3 is an arrangement of the electrodes by means of which the desired burning condition of the electrodes may be obtained. Figs. 4 and 5 illustrate further arrangements of the electrodes for carrying out the present method.

I have observed that in the burning condition of the electrodes, which it is the object of my invention to avoid, and which is illustrated in Fig. 1, the flame $f$ proceeding from the negative electrode $b$, which generally does not contain any light emitting admixtures of metal, metal salts or carbids, and is thus a so-called pure carbon, envelops the positive electrode $a$, which contains such admixtures and this is a "flame arc" carbon, to a considerable part of its length. The current then not only emerges from the face end $c$ of the positive electrode $a$, but also along the shell $d$ of the electrode. The consequence is that the crater of the positive electrode $a$ is not hollowed out at the face of the end $c$, as I have described it with the use of a jet of indifferent gas or vapor enveloping the burning end of the carbon in my U. S. Patent No. 1,029,787, but the end of the positive carbon $a$ remains almost flat as the end at $e$ in Fig. 1. The positive electrode $a$ burns down under such conditions comparatively slowly, apparently because the flame proceeding from the negative electrode $b$ envelops the positive electrode with a result that the oxygen of the air is kept off. The potential of the arc is then comparatively low, for instance 40 to 43 volts, and the same is true also of the intensity of the light emitted from the tip of the positive electrode.

Under the conditions of burning as shown in Fig. 2, which I intend to obtain according to my hereinafter described method, but without the aid of a jet of indifferent gas enveloping the positive carbon, the current emerges essentially at the face of the end $c$ of the positive electrode $a$. The crater of the positive electrode $a$ thereby is hollowed out as indicated in the drawing, to a great depth, and a high intensity is obtained. The flame $f$ proceeding from the negative carbon $b$ is then deflected, as shown in Fig. 2, and the potential rises from 40 to 43 volts as before to 70 to 75 volts. I have further observed that when using a high current density in the electrodes, the particles are propelled from the negative electrode about in the middle of the flame at an extraordinarily high velocity, because in the middle of the negative flame a clearly distinguishable tongue $f'$ is visible appearing like a blue flame. When this blue flame strikes against the middle of the crater of the positive electrode, the positive flame is not permanently able to deflect the negative flame. Then the burning condition shown in Fig. 1 will appear, in which only a small intensity of light is obtained from the positive crater, the same remaining practically flat. The tongue $f'$ of the flame $f$ is, in the position of the electrodes shown in Fig. 1, directed against the center of the face end of the positive electrode $a$, the point of the core, however, stopping a little short of the positive electrode.

To avoid the unfavorable condition shown in Fig. 1, in particular the unfavorable flat crater in the positive electrode, and to obtain the favorable condition and a deep hollowing of the positive crater, as shown in Fig. 2, the conditions are so arranged that the tongue $f'$ of the negative flame can strike the positive crater in its upper part only, since the electrodes are arranged horizontally and the upward draft of air turns the negative flame upward so that the flame proceeding from the positive carbon can deflect the negative flame, entirely away from the positive crater. Moreover, to obtain the effect shown in Fig. 2, the electrodes may be either exactly coaxial as shown in Fig. 2, or the axis of the negative carbon may be a little above the axis of the positive carbon, as shown in Fig. 3. The tips of the electrodes may, also, be at an angle to each other as shown in Fig. 4. A further method of obtaining the favorable burning condition shown in Fig. 2, consists in the production of a very high vapor pressure at the positive electrode. When the vapor pressure is sufficiently high, it will likewise produce a deflection of the negative flame from the center of the crater. For producing the necessary high vapor pressure, an unusually high current density is used in the positive electrode. For instance, the diameter of $a$ is for this purpose made extremely small as say 20 mm., and this carbon is required to carry 120 amperes or more. These positive carbons will always be such as contain light emitting admixtures in the form of metal or metal salts, carbids, or the like, which are well known in the art. The negative carbon, on the other hand, is generally pure carbon. At so high a current density for producing a very high vapor pressure, the combustion of the positive electrodes is very rapid. The combustion may for instance, amount to 400 mm. in an hour, so that the quantity of electrode substance evaporated within a time unit is very considerable. It will be understood, however, that I do not desire to limit myself to the particular method of increasing the vapor pressure just mentioned, since other methods will suggest themselves immediately to those accustomed to making and using the so-called "flame arc" carbons. Still another method of deflecting or deviating the tip of the negative flame from the center of the crater of the positive electrode, than by arranging the relative positions of the two electrodes, consists in producing the deflection or deviation of the negative flame by a mechanical blast. Fig. 5 illustrates such an arrangement, in which the tongue $f'$ of the negative flame is deflected from the center of the crater of the positive electrode by means of a fine jet of an indifferent gas issuing from a nozzle $h$ under a suitable pressure. This fine jet of gas need not, however, envelop the burning end of the positive carbon.

Other known methods of deflecting an arc may of course be substituted for the mechanical blast without departing from the spirit of my invention.

The previously described means for obtaining a deep hollowing of the positive carbon crater may be employed either singly or any number of them at the same time, also without departing from the spirit of my invention.

Having thus described my invention, what I claim is:—

1. The method of operating arc lamps which consists in employing a high current density which produces a tongue in the negative flame and deflecting said tongue from the center of the positive electrode.

2. The method of operating arc lamps which consists in employing a high current density which produces a tongue in the negative flame and blowing said tongue away from the center of the positive electrode.

3. The method of operating arc lamps which consists in employing a high current density to produce a tongue in the negative flame and deflecting said tongue away from the center of the positive electrode by a jet of gas.

In testimony whereof I have hereunto set my signature in the presence of two subscribing witnesses.

HEINRICH BECK.

Witnesses:
S. HINZE,
FR. MÜLLER.